United States Patent [19]

Alex et al.

[11] Patent Number: 5,543,489
[45] Date of Patent: Aug. 6, 1996

[54] NON-EXUDING THERMOPLASTIC ELASTOMERS

[76] Inventors: Patrick Alex, 2, Villa des Prommiers, Pecqueuse, France, 91470; Yves Aubert, 8, Clos Epervier, Menneval; Alain Frey, Les Mollands, Saint Leger de Rotes, both of France, 27300

[21] Appl. No.: 233,602

[22] Filed: Apr. 19, 1994

[30] Foreign Application Priority Data

Apr. 21, 1993 [FR] France .................................. 93 04678

[51] Int. Cl.⁶ .............................................. C08G 63/42
[52] U.S. Cl. ................... 528/288; 528/323; 528/328; 525/419; 525/420; 525/430; 525/434; 525/435; 525/436
[58] Field of Search ..................... 528/288, 328, 528/323; 525/419, 420, 435, 436, 434, 430

[56] References Cited

U.S. PATENT DOCUMENTS

| | | | |
|---|---|---|---|
| 4,115,475 | 9/1978 | Foy et al. | 525/420 |
| 4,195,015 | 3/1980 | Deleens et al. | 525/420 |
| 4,207,410 | 6/1980 | Burzin et al. | 528/288 |
| 4,331,786 | 5/1982 | Foy et al. | 525/419 |
| 4,839,441 | 6/1989 | Cuzin et al. | 528/328 |
| 4,864,014 | 9/1989 | Cuzin et al. | 528/279 |
| 4,950,717 | 8/1990 | Seymour et al. | 525/172 |

FOREIGN PATENT DOCUMENTS

| | | |
|---|---|---|
| 0247828A3 | 12/1987 | European Pat. Off. . |
| 0418068A3 | 3/1991 | European Pat. Off. . |
| 0459862A1 | 12/1991 | European Pat. Off. . |
| 2523143 | 9/1983 | France . |

OTHER PUBLICATIONS

Kohjin Co. Ltd., Patent Abstracts of Japan, vol. 16, No. 413 (C–980)(5456), Sep. 1992.

*Primary Examiner*—Samuel A. Acquah
*Assistant Examiner*—P. Hampton-Hightower
*Attorney, Agent, or Firm*—Pennie & Edmonds

[57] ABSTRACT

The invention relates to a composition based on a thermoplastic elastomer comprising polyether sequences in which the amount of matter extractable by ethanol is less than a value sufficient to prevent exudation. Thermoplastic elastomer block copolymer compositions according to the invention comprise polyether blocks and blocks selected from the group consisting of polyamide blocks and polyester blocks, said copolymer compositions incorporating a quantity of terpolymer, selected from the group consisting of ethylene/unsaturated acid ester/unsaturated dicarboxylic acid anhydride terpolymer and ethylene/unsaturated acid ester/unsaturated glycidyl monomer terpolymer, sufficient to prevent exudation of polyamide, polyester, or polyether oligomers or impurities.

10 Claims, No Drawings

NON-EXUDING THERMOPLASTIC ELASTOMERS

FIELD OF THE INVENTION

This invention relates to thermoplastic elastomers that contain polyether units. Said elastomers may be, for instance, polyamide-polyether block copolymers or polyester-polyether block copolymers. According to the present invention they are formulated in such a manner that they are not subject to exudation.

BACKGROUND OF THE INVENTION

The present invention relates to thermoplastic elastomers with polyether units, and more particularly those containing also amide or polyester units. Elastomers with polyether and polyester units are, for example, those sold under the HYTREL trademark. As regards elastomers with polyether and amide units, in this family are found either elastomers having polyethers units and amide, oligoamide, and polyamide units randomly distributed, or elastomers formed by polyether blocks and by polyamide blocks. U.S. Pat. No. 4,207,410 describes the preparation of these random copolymers by reaction of a lactam or of an $\alpha,\omega$-aminocarboxylic acid with a polyether having hydroxy endgroups and a carboxylic diacid. U.S. Pat. No. 4,839,441 describes the preparation of polyether-polyamide block copolymers by reaction of a polyamide derived from a lactam with a carboxylic diacid and a polyether having hydroxy endgroups.

Depending on the conditions of synthesis and the purity of the raw materials, all these products may contain, to a greater or lesser extent, polyether, polyamide, or polyester oligomers and impurities which lower the viscosity, impair the transparency, or, occasionally, even exude. This exudation is all the greater when these copolymers are molded hot.

SUMMARY OF THE INVENTION

It has now been discovered that all of these drawbacks could be overcome by incorporating into these thermoplastic elastomers a polymer having groups which will react with these oligomers. By trapping these products, viscosity is increased, transparency is improved, and exudation is prevented.

The quantity of oligomers and impurities which can migrate and cause the exudation has thus been reduced. They are termed "free" or "able to migrate" as opposed to those which have been trapped or fixed in the thermoplastic elastomer by reaction with the polymer which has been added into the thermoplastic elastomer. The quantity of these oligomers and impurities which are able to migrate (or are free) may be measured by extraction with ethanol.

DETAILED DESCRIPTION OF THE INVENTION

The present invention is a composition based on a thermoplastic elastomer comprising polyether sequences, characterized in that the amount of matter extractable by ethanol is less than a value sufficient to prevent the exudation.

The thermoplastic elastomer may comprise polyether units and polyester units. For example, these are polyether blocks and polyester blocks. These products are known as elastomeric polyesters and are thermoplastic.

The polyethers are, for example, polyethylene glycol, polypropylene glycol, or polytetramethylene glycol. The molar mass $M_n$ of these polyethers may be between 250 and 6,000.

These polyethers condense with at least one carboxylic diacid in order to form the soft segments of the elastomeric polyesters. The polyester blocks result, for example, from the condensation of at least one diol with at least one carboxylic diacid. The diol may be glycol, propanediol, or butanediol. The diacid may be terephthalic acid. These blocks form the hard segments of the elastomeric polyester.

The hard segments may comprise several units resulting from the action of a diol on a diacid. The soft segments may comprise several units resulting from the action of the polyether on a diacid. The hard segments and the soft segments are attached by ester linkages. Such elastomeric polyesters are described in U.S. Pat. Nos. 4,984,376 and 4,988,740, the disclosures of which are herein incorporated by reference.

The thermoplastic elastomers with polyether units may also be ester copolyetherimides. The soft segments are formed by the reaction of polyetherdiamines with tricarboxylic compounds or carboxylic acid anhydrides containing a carboxylic group such as, for example, trimellitic anhydride. The polyetherdiamines used have an average molar mass of 600 to 12,000. These polyetherdiamines may themselves be derived from polyethylene glycol, polypropylene glycol, or polytetramethylene glycol.

The polyester blocks forming the segments in ester copolyetherimides result, for example, from the condensation of at least one diol with at least one carboxylic diacid. The diol may be glycol, propanediol, or butanediol. The diacid may be terephthalic acid. Such ester copolyetherimides are described in U.S. Pat. Nos. 4,984,376 and 4,988,740, the disclosures of which are herein incorporated by reference.

As regards the thermoplastic elastomers which comprise polyether units and amide units, they may be distributed in a random or ordered manner. The amide units may be isolated or group in oligomers arising from the reaction of a diamine with a diacid or from the condensation of an $\alpha,\omega$-aminocarboxylic acid.

The elastomers most used are those comprising polyamide blocks and polyether blocks. The polyamide blocks may arise either from the condensation of a lactam or of an $\alpha,\omega$-amino acid or from the reaction of a diacid and an amine.

These polyamide blocks may be prepared in the presence of a diacid. Polyamide blocks having carboxylic acid end groups are obtained. The molar mass $M_n$ of the polyamide blocks may be between 600 and 5,000.

The polyethers are, for example, polyethylene glycol, polypropylene glycol, or polytetramethylene glycol of molar mass $M_n$ between 250 and 6,000, and several polyethers may be linked into a chain, for example, by diacids in the case of polyetherdiols.

It is within the scope of the invention to use other elastomers having both polyamide blocks and polyether blocks. These products may be prepared by the reaction of the lactam or $\alpha,\omega$-amino acid of a diacid and of polyetherdiol or polyetherdiamine. It is also possible to condense polyamide blocks having amine endgroups with diacid polyesters, or to condense polyamide blocks having acid endgroups with polyetherdiamines.

All of these products are described in U.S. Pat. Nos. 4,331,786, 4,115,475, 4,195,015, 4,839,441, and 4,864,014, the disclosures of which are herein incorporated by reference.

The extraction with ethanol is according to the FDA 1 212 502 standard. Said standard is herein incorporated by reference. The quantity of extractables is expressed as a percentage of the weight of the elastomer.

It has been discovered that the quantity of extractables, that is to say of oligomers or of impurities able to migrate, could be lowered sufficiently in order to prevent any exudation, even after several months, and even if the elastomer was extruded or molded hot. This quantity may vary depending on the conditions of use of the elastomer. It was found that a quantity less than 3.5% was most often sufficient.

In order to lower the quantity of extractables below the threshold where exudation appears, it suffices to incorporate into the thermoplastic elastomer a polymer (B) having groups which will react with the oligomers and the impurities in order to trap them, thus preventing them from migrating.

The polymer B is any product which reacts with the residues of the synthesis of the thermoplastic elastomer. These residues may be polyetheroligomers, impurities coming from the monomers or their reaction product obtained during the synthesis, or any combination of these products. The polymer B traps these products. In the thermoplastic elastomer, the presence of products of low molar mass, which are different from the thermoplastic elastomer and impair the properties thereof, is thus prevented. For example, they lower the viscosity of the thermoplastic elastomer, decrease its transparency, and, during conversion with heating, there may be exudation. It has been found that thermoplastic elastomers treated by incorporation of a sufficient quantity of polymer B have a better transparency, a higher viscosity, and no longer exude.

Polymer B is incorporated by the usual means directly in the desired proportions or with the aid of masterbatches. The quantity of polymer B to be incorporated into the thermoplastic elastomer depends on the nature and the quantity of the oligomers and impurities which it contains. It has been found that a quantity of the polymer B of at most 10 parts per 90 parts of the thermoplastic elastomer was most sufficient. A quantity between 5 and 10 parts is perfectly suitable.

Advantageously, the polymer B is chosen from among ethylene/unsaturated acid ester/unsaturated dicarboxylic acid anhydride copolymers and ethylene/unsaturated acid ester/unsaturated glycidyl monomer copolymers.

For example, the polymer B comprises:

(i) ethylene/unsaturated acid ester units, said acid preferably having ethylenic unsaturation adjacent to the carboxylic group. The unsaturated acid is preferably a monoacid, such as acrylic acid, methacrylic acid, crotonic acid, or cinnamic acid. It may also be a diacid, such as maleic acid, fumaric acid, citraconic acid, glutaconic acid, or muconic acid. In the case of the diacids, the unsaturated acid ester may be a monoester or, preferably, a diester. The alcohol from which the unsaturated acid ester is derived preferably comprises from 1 to 8 carbon atoms. The esterifying group may be linear or branched, such as, for example methyl, ethyl, n-propyl, isopropyl, n-butyl, isobutyl, tert-butyl, isoamyl, n-hexyl, 2-ethylhexyl, or isoctyl, and (ii) units derived either from an unsaturated dicarboxylic acid anhydride, said anhydride being chosen from among citraconic anhydride, itaconic anhydride, tetrahydrophthalic anhydride, and, preferably maleic anhydride; or from an unsaturated glycidylic monomer, the glycidylic monomer being able to be chosen especially from among the glycidyl methacrylates and acrylates, monoglycidyl and diglycidyl itaconate, and monoglycidyl, diglycidyl, and triglycidyl butenetricarboxylate.

By way of example of polymers B, mention may be made of ethylene/acrylic ester/maleic anhydride copolymers and ethylene/acrylic ester/glycidyl methacrylate copolymers. They may be incorporated into thermoplastic elastomers that would otherwise be subject to exudation in any amount that will significantly reduce exudation as described herein. Typical weight ratios of terpolymer to thermoplastic elastomer in the improved thermoplastic elastomer compositions of the present invention range from 5:95 through 10:90 parts by weight.

It is within the scope of the invention also to incorporate, into the thermoplastic elastomer composition, fillers, pigments, UV stabilizers, and other such conventional additives.

EXAMPLE 1

A film having a thickness of 100 to 150 microns is produced, obtained on the basis of the compound of a polyetheresteramide (PEBAX) with an ethylene/acrylic ester/maleic anhydride terpolymer, the ratio by weight of the constituents being 90/10 (PEBAX/terpolymer). As a reference, a film with this same polyetheramide is produced under the same conditions.

The polyetheramide used is obtained by polycondensation of $\alpha,\omega$-dicarboxylated PA 12 sequences of $M_n$=2,000 and of $\alpha,\omega$-dihydroxylated PTMG sequences of $M_n$=2,000. This polymer is composed of 50% by weight of PA 12 and 50% by weight of PTMG. These products are available under the name of PEBAX from Elf Atochem S.A.

The ethylene/acrylic ester/maleic anhydride terpolymer is obtained by polymerization, characterized by a melting point of 65° C. and a comonomer content of 32% which is distributed as follows: 30% acrylic ester and 2% maleic anhydride. This product is available under the name of LOTADER from Elf Atochem S.A.

Results:

The films were observed after a few days exposure in a conditioned room at 23° C. The reference film specimen shows very pronounced exudation of oligomers and UV additives, impairing the appearance and modifying the transparency of the film. The film compounded according to the present invention shows no trace of exudation.

In a similar observation, after 2 months exposure, no trace of exudation was observed on the compounded film.

EXAMPLE 2

A film is produced, obtained by a compound the same polyetheresteramide but with an ethylene/acrylic ester/glycidyl methacrylate terpolymer, characterized by a melting point of 63° C. and a comonomer content of 32% which is distributed as follows: 24% acrylic ester and 8% glycidyl methacrylate (available from Elf Atochem S.A. under the name of LOTADER).

Results:

Observation of the film after a few days exposure provided results equivalent to Example 1.

EXAMPLE 3

Observation of injected plates, having dimensions of 100×100×2 mm, of the compounded products mentioned in Examples 1 and 2, compared with the same polyetheresteramide, leads to identical results as regards exudation as well as transparency.

EXAMPLE 4

The amounts of ethylene/acrylic ester/maleic anhydride or ethylene/acrylic ester/glycidyl methacrylate terpolymer are varied in the ratio of 7/5 and 3% in the polyetheresteramide. Observation of these extruded films, after a few days exposure, revealed the absence of exudation in the products containing the terpolymer.

EXAMPLE 5

Injected plates having dimensions of 100×100×2 mm of the following products are produced:

Product 1: Compound of the polyether-esteramides A+A1 in a ratio of 55/45 (A/A1).

Product 2: Compound of the polyether-esteramides A+A1 with the ethylene/acrylic ester/maleic anhydride terpolymer; ratio of the constituents, 50/40/10 (A/A1/terpolymer).

Product 3: Compound of the polyether-esteramides A+A1 with the ethylene/acrylic ester/glycidyl methacrylate terpolymer; ratio of the constituents, 50/50/10 (A/A1/terpolymer).

The polyetheresteramide "A" used is obtained by polycondensation of α,ω-dicarboxylated PA 12 sequences of $M_n$=850 and of α,ω-dihydroxylated PTMG sequences of $M_n$=2,000. This polymer is composed of 30% by weight of PA 12 and 70% of polyether.

The polyetheresteramide "A1" used is obtained by polycondensation of α,ω-dicarboxylated PA 12 sequences of $M_n$=1,000 and of α,ω-dihydroxylated PTMG sequences of $M_n$=1,000. This polymer is composed of 50% by weight of PA 12 and 50% of polyether.

Results

The plates produced with Product 1 have a certain opalescence as well as area of the flow emphasizing relative compatibility between the two polyetheresteramides. These same specimen plates show, after a week, a slight exudation on the surface.

On the other hand, the plates produced with Products 2 or 3 are perfectly transparent, homogeneous, and do not show any exudation.

The incorporation of the "LOTADER" does not alter the colour and would even seem to decrease the yellowing (see Table 1 below). Likewise, the transparency is enhanced as is shown by the light-transmission results (see results of Table 1 below).

TABLE 1

| Products | 1 | 2 | 3 |
|---|---|---|---|
| PEBAX A | 55 | 50 | 50 |
| PEBAX A1 | 45 | 40 | 40 |
| E-AE-MAH terpolymer | — | 10 | — |
| E-EA-GLYMA terpolymer | — | — | 10 |
| Melt Flow Index at 235° C., Weight 1 Kg, 2 mm die, ASTM 1238 standard) | 29.5 | 21.5 | 12 |
| Yellow Index | 28.20 | 25.95 | 26.36 |
| Light transmission | | | |
| 400 nm | 13.86 | 16.70 | 16.69 |
| 500 nm | 38.05 | 59.41 | 59.61 |
| 600 nm | 53.24 | 64.48 | 64.81 |
| 700 nm | 68.68 | 69.68 | 70.19 |

EXAMPLE 6

An elastomer was prepared having polyamide and polyether sequences by condensation of an α,ω-dicarboxylated PA 12 sequence of $M_n$=4,000 and of α,ω-di-hydroxylated PTMG sequences of $M_n$=1,000. This elastomer is composed of 80% by weight of PA 12 and of 20% by weight of PTMG. This is called PEBAX in the remainder of this Example.

Various quantities of the following polymers B are incorporated into this PEBAX:

B1 is an ethylene/acrylic ester/maleic anhydride terpolymer having a melting point of 65° C. and containing 30% acrylic ester and 2% anhydride;

B2 is an ethylene/acrylic ester/glycidyl methacrylate terpolymer having a melting point of 63° C. and containing 24% acrylic ester and 8% epoxide.

The amount of extractables is measured with ethanol. Eight hours of refluxing was used, the sample being approximately 15 grams, the volume of ethanol being 0.3 liters, and the quantity of extractables being determined by dry extract.

The results are shown in Table 2 below.

TABLE 2

| | Amount of extractables (%) |
|---|---|
| PEBAX = Reference | 5.3 |
| 90% Pebax + 10% $B_2$ | 3.0 |
| 95% Pebax + 5% $B_2$ | 3.0 |
| 90% Pebax + 10% $B_1$ | 2.8 |
| 95% Pebax + 5% $B_2$ | 2.8 |

IR spectra were obtained on the ethanolic extracts. The IR spectra were obtained using depositions on a KBr window.

PEBAX-reference ethanolic extract:

The IR spectrum is characteristic of PEBAX oligomers with the presence inter alia of bands characteristic of the vibrations:

| $V_{C-O}$ | Ester | near 1736 $cm_{-1}$ |
|---|---|---|
| $V_{C-O-C}$ | Ether | near 1110 $cm_{-1}$ |
| $V_{C=O}$ | Amide 1 | 1645 $cm_{-1}$ |
| $V_{NH}$ | Amide 2 | 1550 $cm_{-1}$ |

Possible presence of free PTMG.

Ethanolic extracts on PEBAXs incorporating polymer B

The IR spectra are identical. In addition to the bands observed in the extract from the PEBAX, a small band at 3460 $cm_{-1}$, corresponding to the 2 $V_{C=O}$ ester harmonic vibration of the polymer B (LOTADER), is noticed. The extracts therefore consist of PEBAX and LOTADER oligomers. On the other hand, the C—O—C ether band at 1110 $m_{-1}$ is less intense than in the reference extract. It is therefore believed that the free polyether has reacted on the anhydride functions of the LOTADER and becomes, thereby, less extractable by ethanol.

Although this invention has been described with reference to certain specific embodiments thereof, the invention should not be construed as being limited to such specific embodiments. Alternative embodiments will readily occur to those skilled in the art based upon the principles disclosed herein. Accordingly applicants are to be bound only by the scope and spirit of the invention as expressed in the following claims.

What is claimed is:

1. A thermoplastic elastomer comprising a polyamide-polyether block copolymer, said elastomer being substantially free of exudable impurities as evidenced by said elastomer having the property that less than 3.5% by weight of the matter of said elastomer is extractable by ethanol.

2. A thermoplastic elastomer according to claim 1 wherein said elastomer is a polyetheresteramide that incorporates a terpolymer selected from the group consisting of ethylene/unsaturated acid ester/unsaturated dicarboxylic acid anhydride terpolymer and ethylene/unsaturated acid ester/unsaturated glycidyl monomer terpolymer.

3. A thermoplastic elastomer according to claim 2 wherein said terpolymer is selected from the group consisting of ethylene/acrylic ester/maleic anhydride terpolymer and ethylene/acrylic ester/glycidyl methacrylate terpolymer.

4. A thermoplastic elastomer according to claim 3 wherein said terpolymer is incorporated into said elastomer in a ratio of from 5:95 through 10:90 as compared to the weight of said polyetheresteramide.

5. A method of preparing a thermoplastic elastomer according to claim 1 that comprises the steps (a) providing a thermoplastic elastomer subject to exudation, (b) providing a quantity of terpolymer, selected from the group consisting of ethylene/unsaturated acid ester/unsaturated dicarboxylic acid anhydride terpolymer and ethylene/unsaturated acid ester/unsaturated glycidyl monomer terpolymer, and (c) mixing said terpolymer with said elastomer to form a thermoplastic elastomer, wherein the quantity of terpolymer is such that the resulting thermoplastic elastomer is not subject to exudation.

6. A method according to claim 5 wherein said thermoplastic elastomer subject to exudation is a polyamide-polyether block copolymer and said terpolymer is selected from the group consisting of ethylene/acrylic ester/maleic anhydride terpolymer and ethylene/acrylic ester/glycidyl methacrylate terpolymer.

7. A method according to claim 6 wherein said quantity of terpolymer is 10 parts or less by weight per 90 parts by weight of said thermoplastic elastomer.

8. A method according to claim 7 wherein said quantity of terpolymer is at least 5 parts by weight per 95 parts by weight of said thermoplastic elastomer.

9. A thermoplastic elastomer block copolymer comprising polyether blocks and blocks selected from the group consisting of polyamide blocks and polyester blocks and mixtures thereof, said copolymer incorporating a therein in a ratio of from 5:95 through 10:90 parts by weight a terpolymer selected from the group consisting of ethylene/unsaturated acid ester/unsaturated dicarboxylic acid anhydride terpolymer and ethylene/unsaturated acid ester/unsaturated glycidyl monomer terpolymer.

10. In a method of manufacturing an article by extrusion or hot molding, the improvement that comprises using as the substance being extruded or hot molded a thermoplastic elastomer according to claim 1.

* * * * *